Sept. 22, 1964 T. C. MURRAY ETAL 3,150,004
XEROGRAPHIC TRANSFER APPARATUS

Filed Nov. 1, 1962 6 Sheets-Sheet 1

INVENTOR.
THOMAS C. MURRAY
JOSEPH B. STONE
BY FRANKLIN S. REESE

ATTORNEY

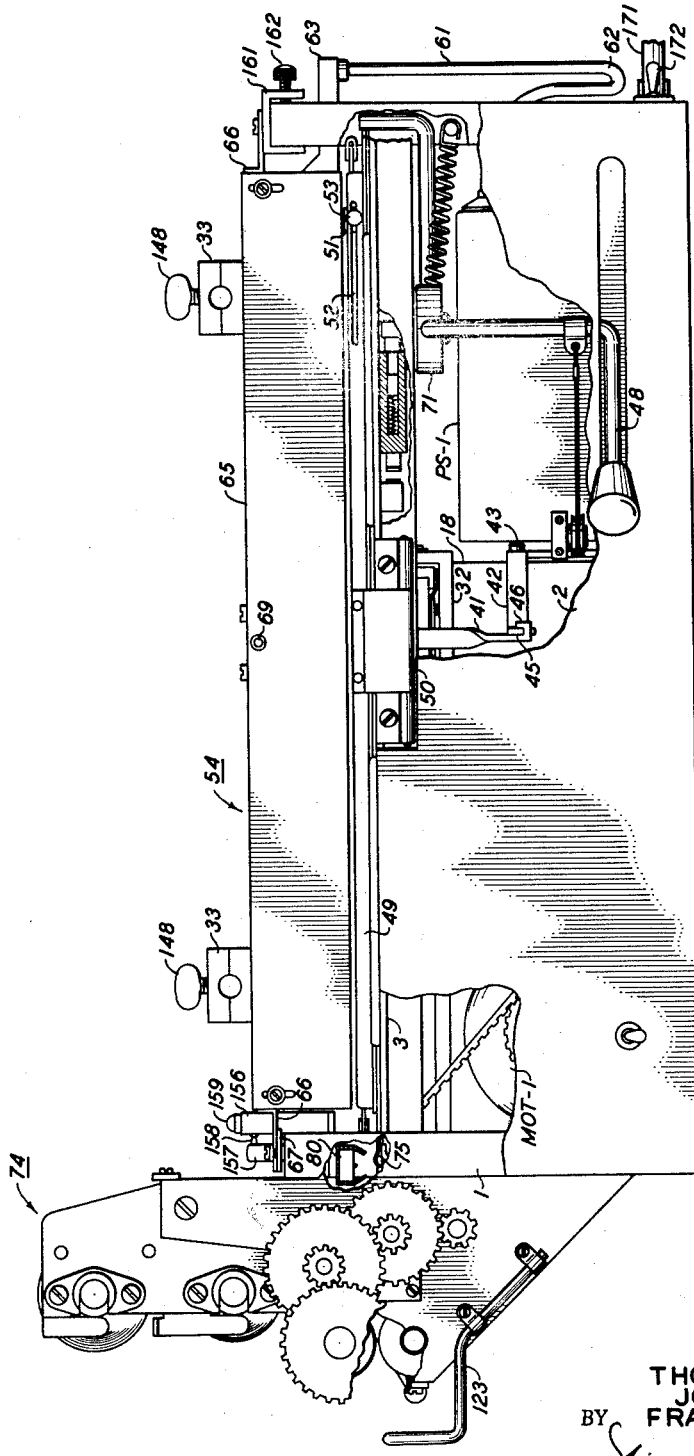

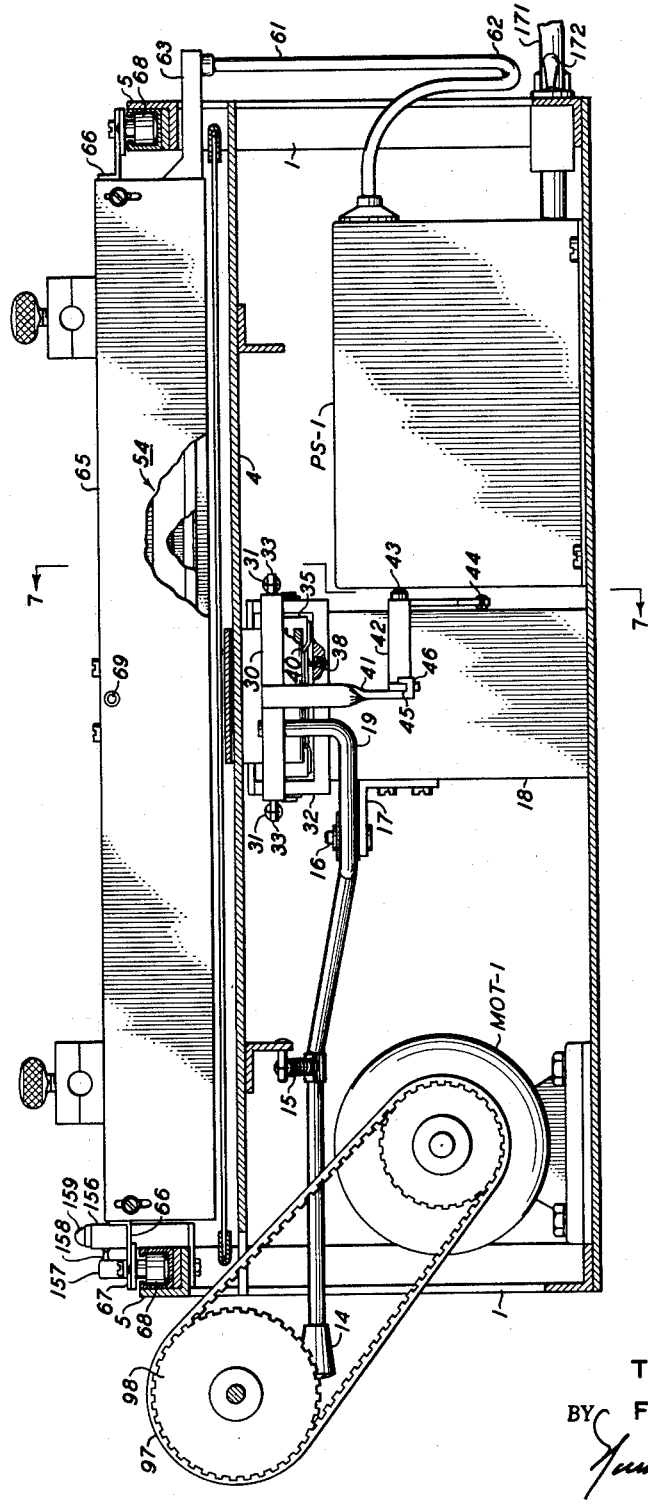

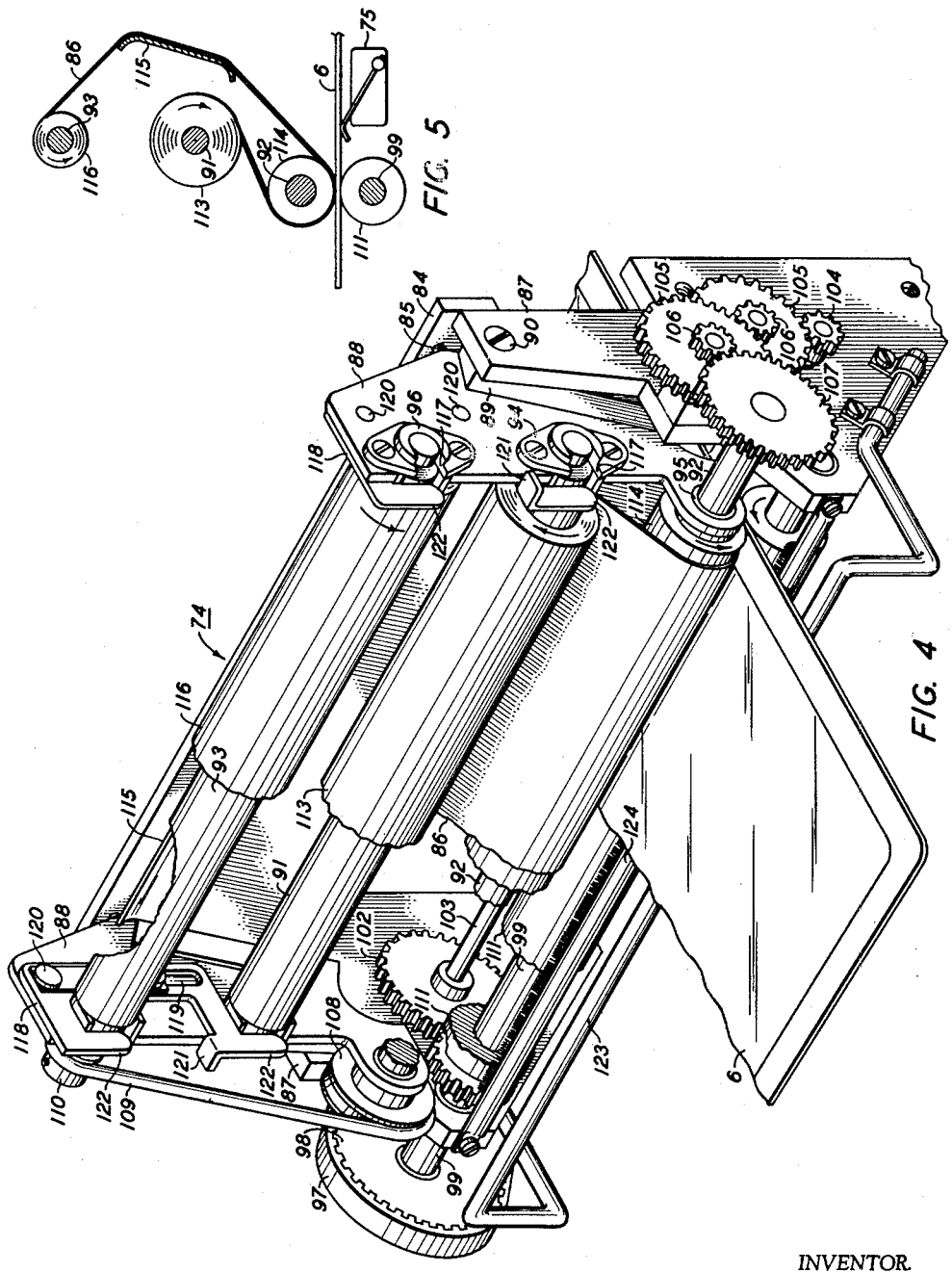

Sept. 22, 1964  T. C. MURRAY ETAL  3,150,004
XEROGRAPHIC TRANSFER APPARATUS
Filed Nov. 1, 1962  6 Sheets-Sheet 5

INVENTOR.
THOMAS C. MURRAY
JOSEPH B. STONE
BY FRANKLIN S. REESE

ATTORNEY

INVENTOR.
THOMAS C. MURRAY
JOSEPH B. STONE
FRANKLIN S. REESE
BY
ATTORNEY

United States Patent Office 3,150,004
Patented Sept. 22, 1964

3,150,004
XEROGRAPHIC TRANSFER APPARATUS
Thomas C. Murray, Rochester, Joseph B. Stone, Penfield, and Franklin S. Reese, Victor, N.Y., assignors to Xerox Corporation, Rochester, N.Y., a corporation of New York
Filed Nov. 1, 1962, Ser. No. 234,686
1 Claim. (Cl. 118—637)

This invention relates generally to xerographic reproducing apparatus and more particularly to apparatus for transferring a powder image from a xerographic plate to a sheet of support material.

In the xerographic process, an electrostatically charged photoconductive surface of a xerographic plate is exposed to a light image of original copy being reproduced. The photoconductive surface discharges the electrostatic charge in the areas exposed to light and retains the electrostatic charge in the non-exposed areas, thus, producing a latent electrostatic image of the copy being reproduced on the surface of a xerographic plate. The surface of the plate is then exposed to a finely divided powder which adheres to the areas containing the electrostatic charge, producing a powder image of the copy being reproduced. Suitable apparatus for charging and exposing the xerographic plate and for developing the powder image thereon is fully described in the copending application Ser. No. 227,340 filed October 1, 1962, in the name of Thomas C. Murray et al.

The powder image on the xerographic plate must be transferred to a sheet of support material and bonded thereto. The present invention encompasses apparatus to effectively transfer the powder image to a sheet of support material properly aligned thereon, without smudging or smearing the powder image.

It is therefore the primary object of this invention to produce a new improved xerographic transfer apparatus for electrostatically transferring a powder image from a xerographic plate to a sheet of support material.

It is another object of this invention to provide a xerographic transfer apparatus which requires very little operator time, is easily operated by inexperienced personnel and reduces time and expense in transferring images and cleaning plates.

These and other objects of the invention are obtained by means of a frame for supporting a xerographic plate containing a powder image thereon, an electrostatic transfer device movably mounted on the frame to pass over the surface of the xerographic plate, and a web cleaner through which the xerographic plate must pass as it is removed from the frame. There are provided support material registration guides to properly align the support material with respect to the powder image on the xerographic plate, plate clamping means to hold the plate in the proper rigid position within the frame member, and ejecting means for removing the plate through the web cleaner. Although the apparatus is generally usable with a standard sheet of paper, it is also adaptable for use with lithographic masters. The term "support material" throughout this application will be used in reference to either ordinary paper, metal or paper lithographic masters, or any material used to receive a powder image from a xerographic plate. The term "master" is used to designate lithographic printing plates, or any material from which further reproductions are to be made.

For a better understanding of the invention as well as other objects and further features thereof, reference is had to the detailed description of the invention to be read in connection with the accompanying drawings, wherein:

FIG. 2 is a front view of the xerographic transfer and cleaning unit shown in FIG. 1;

FIG. 3 is a sectional view of the xerographic transfer and cleaning unit shown in FIG. 1 taken along line 3—3 of FIG. 2;

FIG. 4 is an enlarged isometric view of one embodiment of a web cleaning assembly of the xerographic transfer and cleaning unit shown in FIG. 1;

FIG. 5 is a schematic representation of the web travel of the web cleaning assembly;

Figure 1:
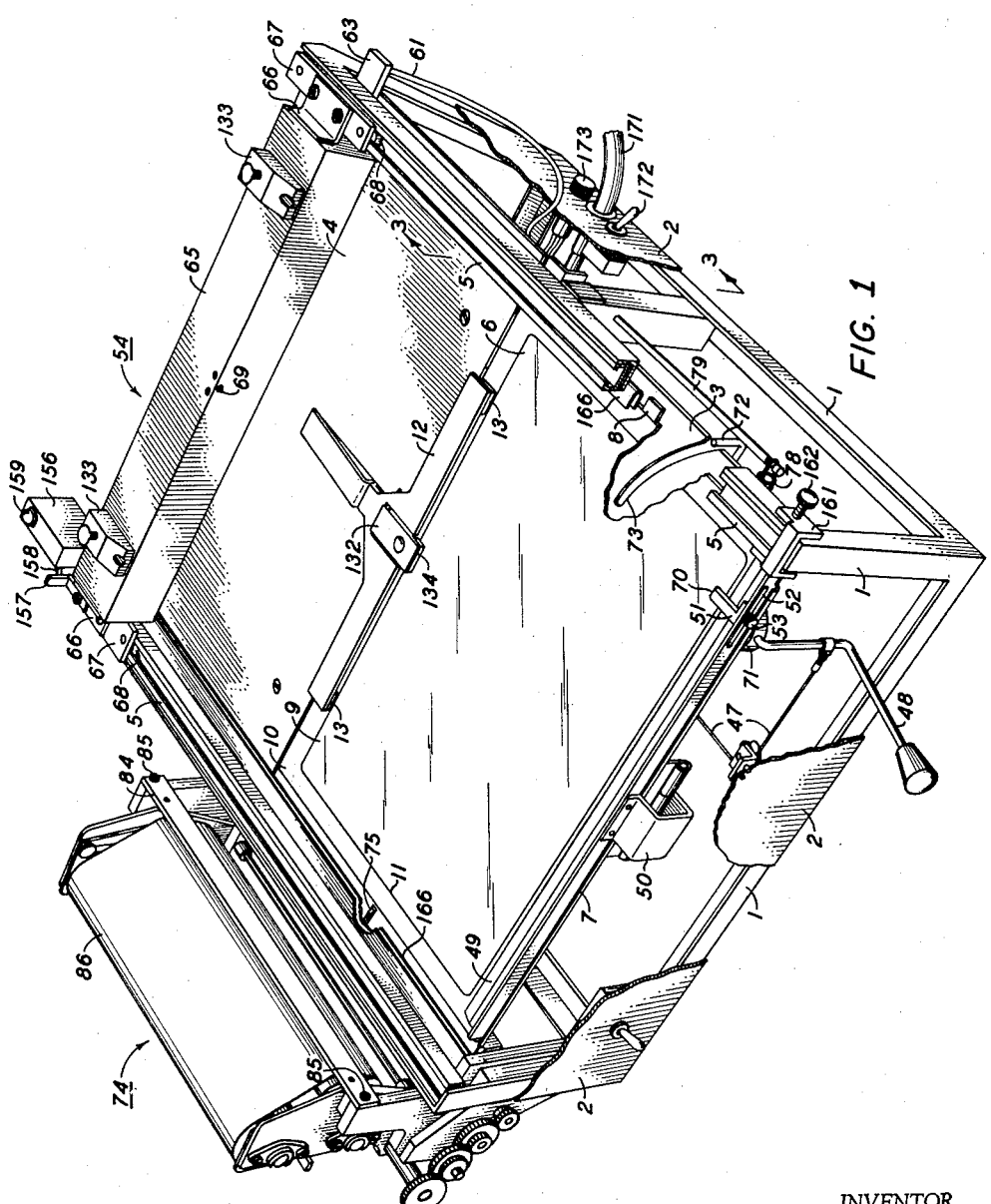
FIG. 1 is an isometric view of one embodiment of a xerographic transfer and cleaning unit.

Referring now to FIG. 1, there is shown a xerographic transfer and cleaning unit including a frame 1 enclosed by side covers 2, here shown broken away to reveal the internal structure of the apparatus. The frame 1 has a front top cover 3, a rear top cover 4 and a pair of guide tracks 5 extending along the top side edges. The top cover 3 is sized to receive and support a xerographic plate 6. The plate 6 is properly positioned on the top cover 3 by abutting two sides of the plate against a front lip 7 and a side block 8 on the front and side top edges, respectively, of the frame 1.

The xerographic plate 6 consists of a photoconductive surface 9, such as selenium, on a conductive backing member 10. The photoconductive surface 9 does not completely cover the plate member 10, thus leaving a border or edge 11 around the outer periphery of the plate. When the plate 6 is placed in the transfer unit, there is a powder image on the photoconductive surface 9 which is to be transferred to a sheet of paper or support material. Proper alignment of the support material with respect to the powder image is important for proper registration of the final transferred image onto the support material. To ensure that the plate 6 does not move during the transfer operation, a plate clamp 12 is provided at the rear side of the plate 6 extending out of the rear top cover 4. Plate clamp 12 extends over front top cover 3, and plate 6 a distance sufficient to hold plate 6 but not to contact the photoconductive surface 9. A pair of polyurethane pads 13 on each end of the clamp 12 press against the plate 6 holding it securely in position.

Figure 7:
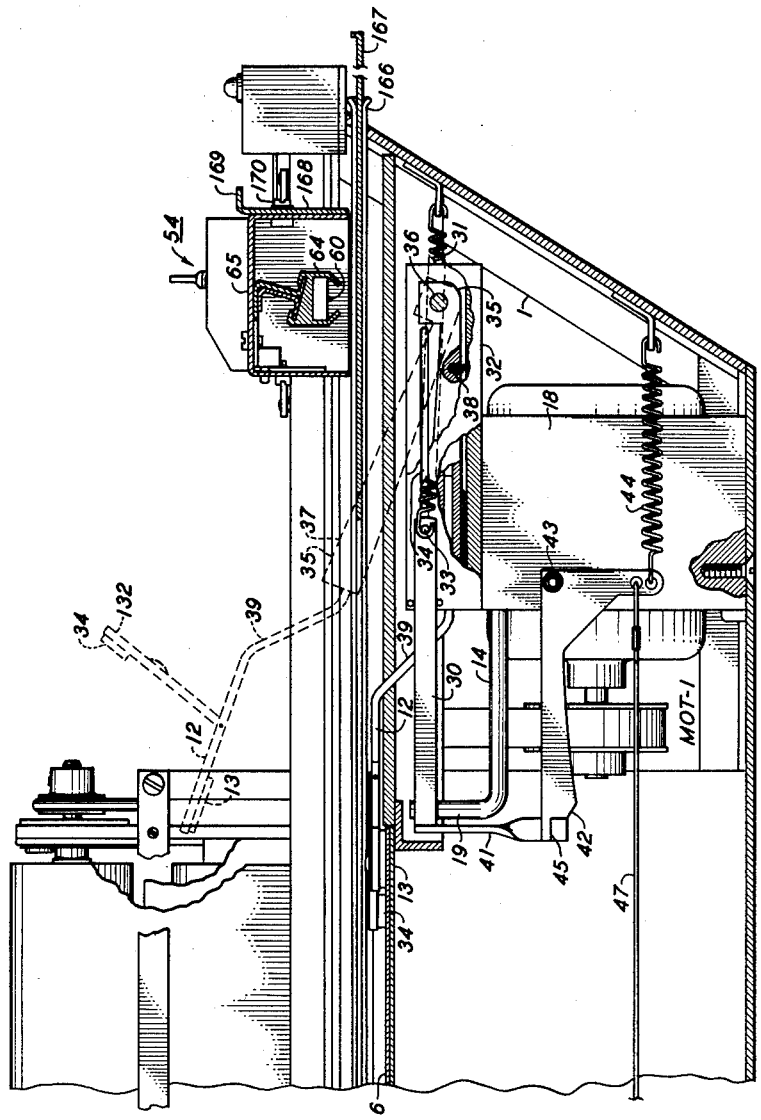

To place the plate clamp 12 into a locked position wherein plate 6 is held rigidly in the transfer unit, as shown by the solid lines in FIG. 7, a plate clamp lever 14, shown in FIG. 3, is moved to the rear of the transfer unit against the action of tension spring 15 mounted between the rear top cover 4 and the clamp lever 14. The plate clamp lever pivots about a pin 16 mounted in a bracket 17 which is rigidly secured to a mounting block 18. The rearward movement of the plate clamp lever 14 moves an arm 19 which extends upwardly from the plate clamp lever to engage a spring loaded yoke 30, pulling the yoke forward against tension spring 31. The yoke 30 is a U-shaped member extending around a channel-shaped clamp mounting frame 32, rigidly secured to block 18.

The yoke 30 contains a pin or rod 33 (see FIG. 7) which extends through two slots 34 in each of the clamp mounting frame sides. The pin 33 extends across the channel-shaped mounting frame over a clamp receiving member 35 which fits into the channel portion of the clamp mounting frame and is pivotally attached to the rear of the mounting frame 32 by pivot pin 36. The top side 37 of the clamp receiving member 35 is slanted or sloped from the clamp end downward to the pivoted end. The pin 33 of the yoke 30 extends across the clamp receiving member and rides on the sloped surface 37. A pairs of compression springs 38 in the bottom of the channel portion of the clamp mounting frame 32 press upward on the bottom of the clamp receiving member 35 urging it to a position shown by the dotted lines in FIG. 7. In this position, the plate clamp 12 would be away from the plate 6 in an unclamped position and the yoke 30 would be toward the rear of the transfer unit, that is, drawn in around the mounting frame 32 with the pin 33 extending across the clamp receiving arm at the lowest point of the sloped surface 37.

As the movement of the clamp lever 14 pulls the yoke forward, the pin 33 rides on the sloped surface 37 of the clamp receiving member 35 forcing the clamp receiving member downward into the channel of the mounting frame 32 against springs 38. There is a grooved T slot in the bottom of the plate receiver member 35 which is adapted to receive arm 39 of the plate clamp 12. The plate clamp 12 is held in the T slot by a leaf spring 40 and moves with the receiving member so that as the receiving member is forced downward against the compression springs 38, the plate clamp moves downward and presses against plate 6.

The yoke 30 is held in a forward position holding the clamp 12 against the plate 6 by means of a locking arrangement consisting of an arm 41 extending downward from the yoke 30 and engaging a yoke lock lever 42. The lock lever 42 is pivotally mounted on the mounting block 18 by a pivot pin 43 and is urged into a locking position, as seen in FIG. 7, by a tension spring 44 attached to the frame 1 of the transfer unit. The yoke lock has a notched end 45 which engages a projection 46 on the end of arm 41, and holds the yoke in a forward position. Clockwise movement, as seen in FIG. 7, of the yoke lock releases the arm 41 and permits the yoke to be drawn rearward by springs 31. Release action of the yoke lock 42 is produced by a wire 47 attached to ejection lever arm 48 at the front of the transfer unit, the action of which will be discussed more fully below.

To aid in the proper alignment of the support material and the powder image, a longitudinal paper guide 49 is mounted along the front top edge of the transfer unit and is attached to the frame 1 by means of a hinge member 50 beneath the level of the front top cover 3. When the plate 6 is placed in the transfer apparatus, the paper guide 49 is in an open position, that is, swung away from and below the level of the front top cover 3. After the plate 6 is properly positioned on the front top cover 3 and is clamped in position with clamp 12, the guide 49 is swung upward onto plate 6 touching only the border portion 11. A small lateral paper guide 51 is mounted on longitudinal paper guide 49 to adjust the image registration on the support material in a lateral direction. The paper guide 51 is mounted in a slot 52 on paper guide 49 and is adjustably mounted therein by means of a set screw 53. When the paper guides 49 and 51 are in position, that is, a closed position overlying the top of the xerographic plate 6, a sheet of support material is abutted against the paper guide 49 and against paper guide 51 and allowed to rest on the xerographic plate 6.

The transfer of the xerographic powder image from the plate surface to the support material is effected by means of an electrostatic transfer device 54. The transfer device 54, herein shown as a corotron, includes an array of one or more corona discharge electrodes 60, as seen in FIG. 7, that are energized from a power supply PS–1 through flexible power line 61. The power line 61 passes through a protective insulated member 63 and contains a loose loop 62 which permits movement of the corona 54 across the entire length of the transfer unit. The discharge electrodes 60 are enclosed by the shielding member 64 which is mounted in a corotron housing 65. The electrodes 60 and the housing 65 traverse the transfer unit and are supported on each end by support member 66 mounted on roller brackets 67, each of which contain a pair of roller 68 adapted to ride on tracks 5. In operation, the electrostatic field created by the electrostatic transfer device is effective to tack the transfer material electrostatically to the plate surface. Simultaneously with the tacking action, the electrostatic field attracts the toner particles comprising the xerographic powder image from the plate surface causing them to adhere electrostatically to the surface of the transfer material. Manual movement of the corotron 54 along tracks 5 causes the corotron to traverse the support material and the xerographic plate. Simultaneous with the movement of the corona discharge device along track 5, the operator depresses button 69 initiating operation of the power supply PS–1 to the corona electrodes 60. As the corotron approaches the front of the transfer unit, the housing 65 contacts the leading point 70 of the lateral paper guide 51 producing a tipping motion of the paper guide 51 which moves longitudinal paper guide 49 away from the plate 6. Paper guides 49 and 51 then fall downward to the front of the transfer unit. The operator releases button 69 cutting off power to the corona discharge electrodes 60 and moves the corona discharge device back to the rear of the transfer unit. The paper or support material containing a xerographic powder image may now be removed from the xerographic plate 6.

After transfer of the powder image from the xerographic plate 6 to the support material, the support material is removed from the plate 6 and transferred to a suitable fusing device, as for example, the type disclosed in copending application, Ser. No. 227,472, filed October 1, 1962, in the name of Thomas C. Murray and Robert A. Schaffer.

The xerographic plate may be removed from the transfer apparatus by actuating plate ejection lever 48. The ejection lever 48 extends through a pivot block 71 and terminates in a plate ejection arm 72. The ejection arm 72 extends upward through an arcuate slot 73 in the top cover 3, to a point above the top cover 3. In the non-operating position, the ejection arm 72 is back toward the frame 1 out of contact with the xerographic plate. As the ejection lever 48 is actuated, the wire 47 releases the yoke locking device 42 which releases clamp 12 from the plate 6. Further movement of the ejection lever 30 moves the ejection arm 72 along slot 73 contacting plate 6. Continued movement of arm 72 forces plate 6 toward web cleaner 74.

As the plate 6 moves toward the web cleaner 74, it actuates microswitch 75 initiating operation of motor MOT–1 and drive roll 111. The plate 6 is forced between drive roll 111 and a cleaning roll 114 propelling the plate forward through the web cleaner 74. The ejection lever 48 is released and is returned to its non-operating position by means of tension spring 78 connected between the ejection arm 48 and a mounting rod 79 securely fastened to the frame 1.

After a xerographic plate has been used to produce a powder image and that image has been transferred to a support material, there is a certain quantity of residual powder which adheres to the plate surface. It is necessary to completely remove the residual powder prior to reusing the plate.

The residual powder is held on the plate by an electrostatic charge, therefore, prior to attempting to remove the powder from the plate surface, an opposite charge is applied to the plate surface. This is accomplished by a stationary electrostatic discharge device 80, herein also shown as a corotron in FIG. 2 and of the same construction as the corona charging device 54 except that it imparts a negative charge. As stated above, the xerographic plate 6 trips microswitch 75 as it is propelled forward by the ejection arm 48. Switch 75 is electrically connected to a power supply PS–1 to supply the voltage potential to corona 80. Therefore, during the time that the xerographic plate 6 is passing over microswitch 75, it is being moved beneath the corotron 80 and an electrostatic charge is being applied to the plate surface. A disposable fibrous web of material 86 is then forced into sliding contact with the plate surface and absorbs residual powder loosened therefrom by the application of electrostatic charge. The web cleaning apparatus, as seen in FIG. 4, consists of a pair of support frame members 87 secured to main frame 1 in a position to receive plate 6 as it is urged forward by ejection arm 72. Mounted between the support frames 87 are a pair of bearing plates 88 spaced from the frames 87 by spacers 89 and pivotally secured thereto by fasteners 90. Mounted between the bearing plates 87 are a web supply shaft 91, a web cleaning shaft 92 and a web take-up shaft 93 rotatably journaled in bearings 94, 95 and 96, respectively. An adjustment bar 84 is secured to both frame members 87 and contains a pair of set screws 85 that bear against the bearing plates 88. Movement of set screws 84 produces a pivoting movement of the bearing plates 88 and an adjustment of the space between a cleaning roll 114 on shaft 92 and a drive roll 111 thus regulating the pressure applied to the xerographic plate.

Power to the web cleaner is transmitted from motor MOT-1 through drive belt 97 to main pulley 98 to drive shaft 99. Drive shaft 99 is appropriately journaled in the support frame 87 and drives the plate drive roll 111. The opposite end of drive shaft 99 is journaled in the opposite support frame 87. A pinion 101 mounted on shaft 99 drives a gear 102 to supply power to a power transmission shaft 103. Shaft 103 is journaled in the support frames 87 and, at the opposite end from the gear 102, contains a pinion 104 which transmits power to a series of gears 105 and pinions 106 to produce a speed reduction in a gear 107 mounted on the web cleaning shaft 92. The speed of the shaft 99 and drive roll 111 is approximately 20 times as fast as the speed of the web cleaning shaft 92, thus producing a sliding motion of the plate past the web, and continually exposing clean web to the plate surface.

The cleaning shaft 92 contains a resilient roller around which the web 86 passes, and is pressed into intimate contact with the surface of the xerographic plate 6. On the opposite end of the web cleaning shaft 92 is a pulley 108 and a belt 109 for transmitting power to a pulley 110 mounted on a web take-up shaft 93. Shaft 93 accumulates used web material after it has been on contact with the surface of the xerographic plate 6. Clean web material is supplied from a roll 113 on supply roll shaft 91. The drive roll 111 consists of resilient material mounted on shaft 99 and is kept free of lint and dirt by a brush 124 supported by the frame members 87.

There is seen schematically in FIG. 5 a web 86 supplied from a roll 113 on a shaft 91 which passes around a rubber or resilient cleaning roll 114 on shaft 92 and contacts xerographic plate 6, passes behind a web guide 115 and is wound up on a take-up roll 116 on shaft 93. To permit replacement of the web supply roll 113 and removal of take-up roll 116, the bearings 96 and 94 are constructed with cut-out portions 117. A pair of lock clips 118 are joined to each of the bearing plates 88 to retain the shafts 91 and 93 in the bearings 94 and 96. The lock clips 118 contain a vertical slot 119 and are held in bearing plates 88 by studs 120 which pass through slots 119. The lock clips 118 are movable in a vertical direction by lifting upward on a lever 121. The upward movement of the lever 121 removes the locking arm 122 from the cut-out portions 117 of bearing 94 and 96, freeing the shafts 91 and 93.

As the plate 6 passes over microswitch 75, the microswitch is held in a depressed position but as the trailing edge of the plate passes over the microswitch, the switch is released turning off the power to the drive rolls. The switch 75 is positioned and adjusted to cut off the drive motor when the margin of the plate 6 is between rolls 111 and 114. The plate is then stationary and supported essentially by the border 11, between the web cleaning roll 114 and the plate support roll 111. The forward or leading edge of the plate is supported upon a bracket 123 extending outward from the support frame 87. The plate will remain in this position supported by the bracket 123 and the web cleaning roll 114 and the plate support roll 111, until such time as it is picked up by an operator.

Obviously the plate cleaning may be performed by other means than those shown herein. The web cleaner disclosed is only one embodiment and is not intended to limit the particular apparatus shown.

Many lithographic masters are a larger size than the standard size xerographic plate and require two image transfer operations from the plate to the master to produce a complete image on the master. This is commonly referred to as a "two-up" transfer. The alignment of the two images on the master is critical, and protection of the first transferred powder image is essential during the second transfer. The powder image cannot be fused to the master until both images have been transferred, thus, the first image is still in the powder state during the second transfer and is susceptible to being smeared if it is touched or rubbed. Likewise, the powder image on the plate surface is susceptible to being smeared if it is touched or rubbed by the master before transfer. Procedurally, the process requires clamping the end of the master adjacent to the plate surface without touching the plate surface, and supporting the master above the plate until transfer has been effected. After clamping the master in place, the corotron and the master are moved over the plate and the master is progressively touched to the plate surface. After the corotron has completely traversed the plate surface, it is returned to its original position and the master is removed from the plate with the powder image adhering thereto. The plate is then ejected through the web cleaner as previously described, and a new plate containing the remainder of the image to be transferred is inserted into the transfer unit. The master is reversed so that the end which does not contain the powder image is clamped adjacent to the new plate and the image-containing end is supported by the corotron above the plate surface. The process of transferring the image is then repeated. The apparatus for performing this process will be described fully herein.

Figure 6:
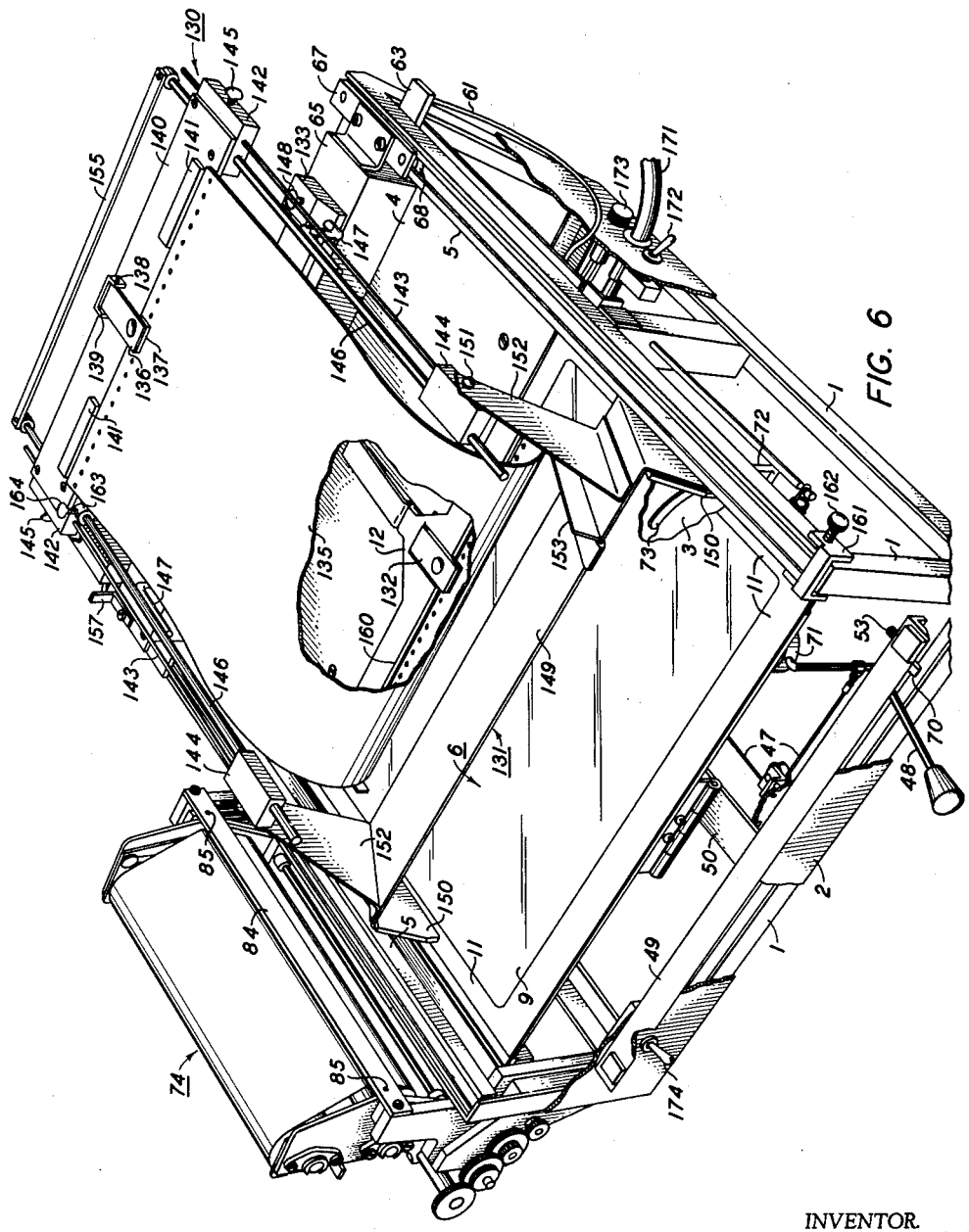
FIG. 6 is an isometric view of the xerographic transfer and cleaning unit containing a suspension assembly for the production of lithographic masters; and, FIG. 7 is a sectional view taken along line 7—7 of FIG. 3.

The preferred embodiment of the "two-up" transfer apparatus is shown, in position, in FIG. 6, and consists primarily of a master support assembly 130, a shielding unit 131 and a clamp 132. The master support assembly 130 and the shielding unit 131 are supported on a pair of mounting blocks 133 rigidly secured to the corotron housing 65. A clamp 132 is mounted on plate clamp 12 and is seen in an open position in the dotted lines in FIG. 7. A resilient pad 134 on the underneath side engages the lithographic master 135 to prevent slippage of the master with respect to the xerographic plate. The clamp 132 is held in a closed position, where it presses on the master, by either a snap-acting fastener, a magnetic latch or any suitable fastening device.

The lithographic master 135 is supported at the opposite end by a second clamp 136 of similar construction to clamp 132, that is, clamp 136 contains a resilient pad 137 and is either a snap-acting fastener, magnetic latch, or a suitable fastening device. The clamp 132 is pivotally supported at pin 138 mounted between the side walls of a U-shaped bracket 139. The bracket 139 is rigidly secured on a support plate 140 in a position so that the clamp 136 co-acts with the support plate to hold the master 6 in position. The master is properly positioned on the support plate 140 by abutting the end of the master against a pair of guide bars 141, on the support plate surface, prior to closing clamp 136.

The support plate 140 has attached to each end a positioning block 142 containing a pair of longitudinal holes. Slideably mounted in one hole in each block 142 is a shield positioning rod 143. The rod 143 is supported by the block 142 and has a shield pivot block 144 secured to the opposite or forward end. The shielding unit 131 may be positioned at the proper point on the xerographic plate without affecting the position of the support plate 140 merely by loosening the locking screw 145 in block 142 and sliding the rod 143 to the desired position.

A pair of adjustment or support rods 146, extending through the second pair of longitudinal holes in the positioning blocks 142 and through a pair of holes in the shield pivot blocks 144, support the entire master support assembly 130 and the shielding unit 131. A suspension arm 147 is rigidly secured to each rod 146, as for example, by welding, and is retained in the mounting blocks 133 on the corotron housing 65 by a pair of set screws 148. Thus, the entire unit is suspended above the corotron housing 65 and the xerographic plate 6.

The shielding unit 131 consists of a flat shielding plate 149 mounted on two triangular shaped sliding blocks 150, and pivotally supported on bolts 151 in shield pivot blocks 144 by a pair of support members 152. A lateral guide 153 is movably mounted on the shield plate 149 to provide proper alignment of the master 135 as it is inserted into clamp 132. The sliding blocks 150 are dragged or pushed across the border 11 of xerographic plate 6 by movement of the corotron 54 and the support assembly 130. The shield plate 149 is held over the plate 6 by sliding blocks 15, a sufficient distance so that the powder image on the plate is not disturbed when the master is clamped into position adjacent the plate.

To position the lithographic master relative to the xerographic plate, one end of the master is placed on the shield plate 149 with the edge of the master abutting the paper guide 153. The paper guide 153 may be previously positioned on the shield plate to provide the proper lateral alignment of the powder image on the master. The master is then moved toward the rear of the transfer unit, until the end of the master is flush with the lip 160 on the plate clamp 12. Movement of the master, to assure that the side and front edge are properly abutting with paper guide 153 and lip 160, respectively, may be made without damaging the powder image on the xerographic plate. At this point, the shield plate 149 supports the master above the xerographic plate so that the powder will not be touched. The clamp 132 is now fastened holding the master in place adjacent the photoconductive surface of the xerographic plate. The master is then bent upward and over rear top cover 4 and the rear edge is abutted against the guide bars 141 on the support plate 140. Clamp 136 is fastened in position holding the master on support plate 140.

With the lithographic master 135 properly clamped in position, as shown in FIG. 6, the corotron 54 and the support assembly 130 are moved forward by the operator. Since the corotron power button 69 is inaccessible with the master support assembly in position, the first movement of the corotron must be toward the rear of the apparatus when an alternate corotron power switch 156 (see FIG. 1) is located. Switch 156 is wired in parallel to switch 69 and is actuated by a protruding member 157, mounted on bracket 67 contacting switch lever 158 on the rearward movement of corotron 54. A small indicator light 159 is mounted on top of switch 156 to indicate that the corotron is energized. When the corotron 54 is returned to its non-operating position, the switch lever 158 is again tripped by the protrusion 157 and the corotron is de-energized.

As the corotron 54 and the support assembly 130 are moved forward, the master 135 is progressively superimposed over the xerographic plate 6, and the shielding unit 131 is moved toward the front of the apparatus. When the corotron reaches the xerographic plate 6, it passes over the master and the plate, tacking the master to the plate, and electrostatically transferring the powder image to the master. The corotron and the support assembly are then moved rearward to the original position drawing the master away from the plate. The clamp 136 is loosened and the master is held at the rearward edge by the operator. The clamp 132 is released and the master is removed. Movement of the ejection lever 48 releases plate clamp 12 and the plate is then ejected through the web cleaner 74 as described above. The second part of the "two-up" transfer is now performed by inserting a new xerographic plate with the complementary powder image and reversing the lithographic master so that the opposite end is now clamped adjacent to the xerographic plate.

During the second transfer of the "two-up" process, the existing image on the master must not be brought into contact with the xerographic plate during the transfer. It is necessary that the new image be transferred to the master, up to the line where the old image stops, but there must be no further movement of the master or the old image will be smeared. For this purpose, there is provided two mechanical stops to regulate the travel of the master and the corotron. The first is a corotron stop 161 movably mounted on track 5 and held in position by thumb screw 162. The side of the track may be calibrated and marked to indicate stop positions for the corotron relative to the image on the xerographic plate. The second stop 163 is slideably mounted in one of the adjustment rods 146 and is held in position by thumbscrew 164.

Since the master is doubled over, the forward movement of the point of contact with the xerographic plate is only half as fast as the movement of the corotron. Therefore, a point will eventually be reached where the line of initial contact between the master and the plate is coincident with a forward line being charged by the corotron. To prevent the image on the master from contacting the plate and to allow all the image on the xerographic plate to be transferred to the master, the position at which these two lines are coincident must be at the point where the powder image on the master is about to contact the plate and also where the powder image ends on the xerographic plate. This is accomplished by setting the corotron stop 161 so that the corotron will not travel past the point where the image on the xerographic plate ends, and adjusting the stop 163 on rod 146 so that the initial movement of the corotron is such that the corotron travels exactly twice as far as the distance from the initial line of contact of the plate and the master, to the desired final line of contact between the plate and master. The initial line of contact may be varied by movement of support plate 140 so that adjustment of stop 163 is a combination of corotron position and support plate position. The rod 146 is calibrated to provide the proper position of the stop 163 for the preselected position of corotron stop 161. When the image is to be transferred the operator grasps the rear of support plate 140 and moves it forward. The support plate 140 moves forward on rods 146 carrying with it the shielding unit 131, until the stop 163 is contacted at which point the corotron starts to move.

After the transfer operation is completed and the corotron is returned to its original position, the master is removed by the method previously described. The shielding unit 131 is swung up over the adjustment rods 146 and the plate 6 is ejected through the web cleaner 74 as previously described. The lithographic master may now be transferred to a suitable fusing device to bond the powder image thereto.

To produce a metal master using the apparatus embodied herein, it is necessary to follow a slightly different method of operation. The metal master has a higher degree of rigidity than a paper master and must, therefore, be held on the xerographic plate surface by a higher charge of static electricity. Also, since the metal master is an electrical conductor rather than an insulator, any charge placed on the master would be drained through the master to the plate at any point of contact, and would not remain on the master to attract the oppositely charged powder particles. Therefore, a uniform charge of static electricity is placed on the surface of the xerographic plate rather than the master and the master is grounded to the plate to effect powder image transfer. A more thorough discussion of the method and theory of image transfer to metal masters may be found in U.S. Patent No. 3,004,860, issued October 17, 1961, to R. W. Gundlach. The additional electric charge is produced by passing the transfer corotron 54 over the surface of the xerographic plate 6, before the lithographic master is placed on the plate. The additional charge is applied directly to the plate surface and will be dissipated through the plate unless the plate is kept in darkness. To accomplish this, the transfer unit is provided with a pair of slotted light-tight runners 166 beneath the corotron tracks 5 and directly above the level of the xerographic plate. A dark slide 167, capable of completely covering the xerographic plate 6 is inserted into the runners 166, at the rear of the unit, and is drawn forward with the corotron 54 by a vertically movable plate 168 on the rear of the corotron. The plate 168 is fastened to the corotron housing 65 by a series of small screws 170 which extend through slotted openings (not shown) in the plate 168 and are secured in the corotron housing 65. The small tab 169 at the top of the plate 168 permits the plate to be raised or lowered a distance sufficient to contact a lip at the front of the slide 167. With the plate 168 in a lowered position, the corotron may be moved forward and the plate 168 will contact a lip in the front of the slide 167 pulling the slide forward over the xerographic plate. When the corotron is at its forward most position, the dark slide is still a distance, equal to the width of the corotron, away from the end of the xerographic plate. The operator at this point reaches to the rear of the unit and pushes the dark slide forward completely covering the plate. The plate is then effectively kept in darkness by the shielding effect of the slide and an additional electric charge is trapped on the surface of the xerographic plate. The corotron is then returned to its original position. A metal lithographic master is abutted against paper guides 49 and 51 much in the same manner as previously described for paper transfers. The metal master overlays the slide 167, and the slide is withdrawn from the rear of the transfer unit. As the slide 167 is withdrawn, the electrostatic charge on the plate surface attracts a metal master effectively tacking the master to the plate surface and transferring the powder image to the surface of the metal master. The master, containing the powder image, may now be removed from the surface of the plate and the plate ejected through the web cleaner 74.

An electrical power supply labeled PS-1 is contained within the unit beneath rear top cover 4, and is capable of supplying either positive or negative potential of the voltage required to the transfer corotron 54 or negative potential to the pre-cleaning corotron 89. Normally the toner powder used contains a negative polarity so that the transfer operation is effected by placing a positive charge on the master or support material. However, if desired, a toner powder containing a positive polarity may be used, in which case the transfer operation is performed by placing a negative charge on the support material surface. The power supply PS-1 receives current through the main power line 171, is turned on and off through the operation of switch 172, and has a safety fuse at 173. A corotron reversing switch 174 provides the proper positive or negative charge to be supplied to the transfer corotron 54.

While the present invention as to its objects and advantages, as described herein, has been carried out in specific embodiments thereof, it is not desired to be limited thereby, but it is intended to cover the invention broadly within the spirit and scope of the appended claim.

What is claimed is:

Apparatus for transferring a powder image from a xerographic plate to a conductive support material including:

a frame, for supporting a xerographic plate in a plate support position, having means to align the plate in the plate support position for proper registration of a powder image thereon, clamping means mounted on the frame to secure the plate in the plate support position, a pair of guide tracks mounted on the frame above and on each side of the plate support position and extending along the length of the plate support position, an electrostatic transfer device spanning the plate support position, and mounted in the tracks for movement over the plate surface, light tight runners mounted on the frame between the guide tracks and the plate support position, and extending along the length of the plate support position, a light impervious shield adapted to fit the light tight runners and be moveable therein to completely cover a plate in the plate support position to shield the plate surface from ambient light, and means to engage the light shield and the electrostatic transfer device to draw the light shield through the runners over the plate support position when the electrostatic transfer device traverses the plate support position, whereby a plate in the plate support position is shielded from ambient light as an electrostatic charge is placed on the plate surface by the electrostatic transfer device.

References Cited in the file of this patent

UNITED STATES PATENTS

| | | |
|---|---|---|
| 2,600,580 | Sabel et al. | June 17, 1952 |
| 2,626,865 | Mayo et al. | Jan. 27, 1953 |
| 2,684,902 | Mayo et al. | July 27, 1954 |
| 2,752,271 | Walkup et al. | June 26, 1956 |
| 2,890,675 | Cheever | June 16, 1959 |
| 2,995,108 | Iwerks | Aug. 8, 1961 |
| 3,063,351 | Medley | Nov. 13, 1962 |